United States Patent
Hosokawa et al.

(10) Patent No.: US 9,281,740 B2
(45) Date of Patent: Mar. 8, 2016

(54) POWER CONVERSION APPARATUS (75) Inventors: Yasuhiko Hosokawa, Chuo-ku (JP);
Toshifumi Ise, Suita (JP); Shinsuke Kadoi, Suita (JP)

(73) Assignees: TOSHIBA MITSUBISHI-ELECTRIC INDUSTRIAL SYSTEMS CORPORATION, Tokyo (JP); OSAKA UNIVERSITY, Suita-shi (JP)

( * ) Notice: Subject to any disclaimer, the term of this patent is extended or adjusted under 35 U.S.C. 154(b) by 35 days.

(21) Appl. No.: 14/376,057

(22) PCT Filed: Mar. 2, 2012

(86) PCT No.: PCT/JP2012/055374
§ 371 (c)(1),
(2), (4) Date: Jul. 31, 2014

(87) PCT Pub. No.: WO2013/128631
PCT Pub. Date: Sep. 6, 2013

(65) Prior Publication Data
US 2014/0376286 A1  Dec. 25, 2014

(51) Int. Cl.
*H02H 7/122* (2006.01)
*H02M 1/34* (2007.01)
*H02M 7/5387* (2007.01)
*H02M 7/539* (2006.01)
*H02M 1/00* (2007.01)

(52) U.S. Cl.
CPC ............... *H02M 1/34* (2013.01); *H02M 7/539* (2013.01); *H02M 7/5387* (2013.01); *H02M 2001/0058* (2013.01); *H02M 2001/346* (2013.01); *Y02B 70/1491* (2013.01)

(58) Field of Classification Search
CPC ... H02M 7/53871; H02M 7/538; H02M 1/32; H02M 2001/342; H02M 1/34
USPC ................... 363/16–17, 24–27, 56.01–56.02, 363/56.07–56.08, 135
See application file for complete search history.

(56) References Cited

U.S. PATENT DOCUMENTS 4,691,270 A * 9/1987 Pruitt ..................... H02M 1/34
363/132
6,618,276 B2 * 9/2003 Bennett ............ H01J 37/32082
363/52

(Continued)

FOREIGN PATENT DOCUMENTS

| JP | 10 285953 | 10/1998 |
|----|-----------|---------|
| JP | 2002 272141 | 9/2002 |

(Continued)

OTHER PUBLICATIONS

Shinsuke Kadoi, et al., "A Soft-Switching Inverter Circuit without Active Switches in Auxiliary Circuits", National Convention Record I.E.E. Japan, The Institute of Electrical Engineers of Japan, vol. 2011, No. 4, pp. 113-114, (Mar. 2011) (with partial English translation).
International Search Report Issued Jun. 5, 2012 in PCT/JP12/055374 Filed Mar. 2, 2012.

(Continued)

Primary Examiner — Rajnikant Patel
(74) Attorney, Agent, or Firm — Oblon, McClelland, Maier & Neustadt, L.L.P.

(57) ABSTRACT

When a snubber capacitor is charged to a level greater than or equal to a predetermined voltage, a protection circuit renders a clamp diode conductive to complete charging of the snubber capacitor.

3 Claims, 7 Drawing Sheets (56) References Cited

U.S. PATENT DOCUMENTS

| | | | |
|---|---|---|---|
| 7,145,786 B2* | 12/2006 | Vinciarelli | H02M 1/088 363/17 |
| 7,397,676 B2* | 7/2008 | Lincoln | H02H 7/122 363/56.01 |
| 8,508,962 B2 | 8/2013 | Hosokawa et al. | |
| 8,605,470 B2 | 12/2013 | Hosokawa et al. | |

FOREIGN PATENT DOCUMENTS

| | | |
|---|---|---|
| WO | 2010 125630 | 11/2010 |
| WO | 2011 036912 | 3/2011 |

OTHER PUBLICATIONS

U.S. Appl. No. 14/373,708, filed Jul. 22, 2014, Hosokawa.

* cited by examiner

POWER CONVERSION APPARATUS

TECHNICAL FIELD

The present invention relates to a power conversion apparatus, particularly a power conversion apparatus performing soft-switching.

BACKGROUND ART

An inverter of a large capacitance used in system interconnection had the problem that the switching loss is so great that the operating frequency cannot be increased. In this context, application of soft-switching is effective.

Various soft-switching inverter circuits have been proposed. For example, the soft-switching inverter circuit disclosed in Non-Patent Document 1 (Shinsuke Kadoi, Hirotake Nakaji, Yushi Miura, Toshifumi Ise, Yasuhiko Hosokawa, "A Soft-Switching Inverter Circuit without Active Switches in Auxiliary Circuits", National Conference of the Institute of Electrical Engineers of Japan, 2011, Vo. 14, pp. 113-114) is characterized in that an active element is not employed in auxiliary circuits, general PWM (Pulse Width Modulation) control is allowed, and the maximum voltage of the main element can be suppressed by the passive clamp circuit.

CITATION LIST

Non Patent Document

NPD 1: Shinsuke Kadoi, Hirotake Nakaji, Yushi Miura, Toshifumi Ise, Yasuhiko Hosokawa, "A Soft-Switching Inverter Circuit without Active Switches in Auxiliary Circuits", National Conference of the Institute of Electrical Engineers of Japan, 2011, Vo. 14, pp. 113-114

SUMMARY OF INVENTION

Technical Problem

However, the soft-switching disclosed in NPD 1 has the problem that, when designed envisaging great faulty current at the load end, the capacitance of the snubber capacitor in the auxiliary circuit is increased due to the influence of the leakage inductance from the transformer and the parasitic impedance of the wiring.

In view of the foregoing, an object of the present invention is to provide a power conversion apparatus capable of reducing voltage stress on the main element and snubber capacitor.

Solution to Problem

A power conversion apparatus according to an aspect of the present invention converts DC power supplied from a DC power supply including a first electrode and a second electrode into AC power for supply to a load. The power conversion apparatus includes: an AC terminal for outputting AC power; a first DC division capacitor and a second DC division capacitor connected in series between the first electrode and second electrode; a first main switch including a first end coupled to the first electrode of the DC power supply and a second end coupled to the load; a first main diode connected in parallel with the first main switch so as to have a conducting direction opposite to the conducting direction of the first main switch; a second main switch including a first end coupled to the second end of the first main switch, and a second end coupled to the second electrode of the DC power supply, provided so as to have a conducting direction identical to the conducting direction of the main switch; a second main diode connected in parallel with the second main switch so as to have a conducting direction opposite to the conducting direction of the second main switch; a first snubber capacitor and a second snubber capacitor; a first snubber diode and a second snubber diode connected in series between the first snubber capacitor and the second snubber capacitor; a protection circuit to cause, when voltage applied to the first snubber capacitor has become greater than or equal to a predetermined value or when voltage applied to the second snubber capacitor has become greater than or equal to a predetermined value, a charging current formerly flowing from the DC power supply to the first snubber capacitor or second snubber capacitor to flow to another current path; and a control circuit controlling the first main switch and the second main switch to be turned on and off. The first snubber capacitor is provided between an anode of the first main diode and a cathode of the first snubber diode. The second snubber capacitor is provided between a cathode of the second main diode and an anode of the second snubber diode. The protection circuit includes a transformer, and a first clamp diode and a second clamp diode connected in parallel with the first main switch and the second main switch, and provided between the first electrode and the second electrode so as to have a conducting direction opposite to the conducting direction of the first main switch and the second main switch. Control circuit 11 provides control, during a positive period in which current flows from the power conversion apparatus to the load, such that when the first main switch is turned off from on, the second main switch is turned on from off at an elapse of a predetermined time, and when the second main switch is turned off from on, the first main switch is turned on from off at an elapse of a predetermined time.

Advantageous Effects of Invention

According to the present invention, the maximum voltage applied to the main element and snubber capacitor can be reduced.

DESCRIPTION OF EMBODIMENTS

Embodiments of the present invention will be described hereinafter with reference to the drawings. In the drawings, the same or corresponding elements have the same reference characters allotted, and description thereof will not be repeated.

Embodiments

<Configuration of Soft-Switching Inverter>

Figure 1:
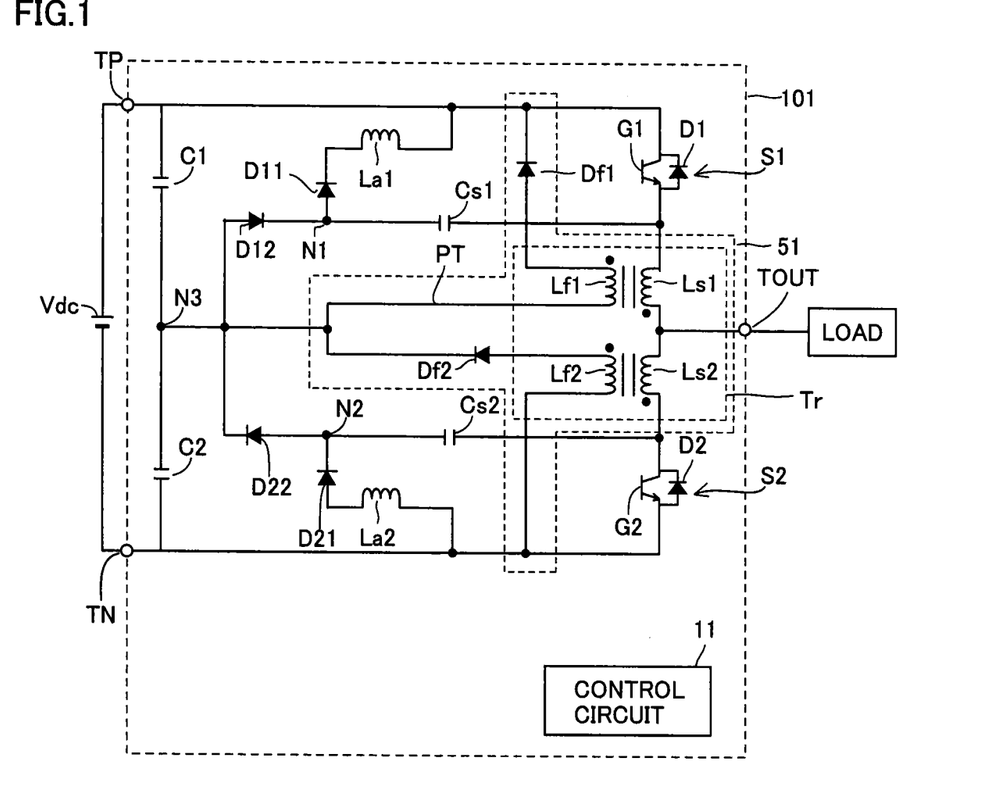
FIG. 1 represents a configuration of a soft-switching inverter 101 according to an embodiment of the present invention.

FIG. 1 represents a configuration of a soft-switching inverter 101 according to an embodiment of the present invention.

Referring to FIG. 1, a soft-switching inverter (power conversion apparatus) 101 includes power supply terminals TP and TN, an AC output terminal TOUT, main switches G1 and G2, main diodes D1 and D2, snubber capacitors Cs1 and Cs2, auxiliary diodes D11 and D21, snubber diodes D12 and D22, auxiliary reactors La1, and La2, a control circuit 11, and a protection circuit 51. Protection circuit 51 includes a transformer Tr, and clamp diodes Df1 and Df2. Transformer Tr includes primary windings Ls1 and Ls2, and secondary windings Lf1 and Lf2. Soft-switching inverter 101 has power supply terminal TP connected to a positive electrode terminal of DC power supply Vdc, and power supply terminal TN connected a negative electrode terminal of DC power supply Vdc. Soft-switching inverter 101 may be configured to include a DC power supply Vdc.

Main switches G1 and G2 are, for example, IGBTs (Insulated Gate Bipolar Transistors).

DC power supply Vdc has a positive electrode connected to power supply terminal TP and a negative electrode connected to power supply terminal TN. DC division capacitors C1 and C2 are connected in series between power supply terminals TP and TN. The connection node of capacitors C1 and C2 is referred to as a node N3.

Main switch G1 has a collector coupled to the positive electrode of DC power supply Vdc and an emitter coupled to a load via an AC output terminal TOUT. In other words, main switch G1 has a collector connected to power supply terminal TP and an emitter connected to a first end of primary winding Ls1 of transformer Tr.

Main diode D1 is connected in parallel with main switch G1 so as to have a conducting direction opposite to that of main switch G1. In other words, main diode D1 has a cathode connected to the collector of main switch G1, and an anode connected to the emitter of main switch G1.

Snubber capacitor Cs1 is connected between the emitter of main switch G1 and a node N1. Auxiliary diode D11 is connected in parallel with main switch G1 and main diode D1, and in series with snubber capacitor Cs1, so as to have a conducting direction opposite to that of main switch G1. In other words, auxiliary diode D11 has an anode connected to node N1, and a cathode connected to the first end of auxiliary reactor La1. Snubber diode D12 has an anode connected to a node N3, and a cathode connected to node N1.

Auxiliary diode D11 and auxiliary reactor La1 are connected between power supply terminal TP and node N1, and also in series with each other.

Auxiliary reactor La1 has a first end connected to the cathode of auxiliary diode D11, and a second end connected to power supply terminal TP.

Main switch G2 has a collector coupled to the emitter of main switch G1, and an emitter coupled to a negative electrode of DC power supply Vdc, and is provided to have a conducting direction identical to that of main switch G1. In other words, main switch G2 has a collector connected to a second end of primary winding Ls2 of transformer Tr, and an emitter connected to power supply terminal TN.

Main diode D2 is connected in parallel with main switch G2 so as to have a conducting direction opposite to that of main switch G2. In other words, main diode D2 has a cathode connected to the collector of main switch G2, and an anode connected to the emitter of main switch G2.

Snubber capacitor Cs2 is connected between the collector of main switch G2 and a node N2. Auxiliary diode D21 is connected in parallel with main switch G2 and main diode D2, and in series with snubber capacitor Cs2, so as to have a conducting direction opposite to that of main switch G2. In other words, auxiliary diode D21 includes a cathode connected to node N2 and an anode connected to the second end of auxiliary reactor La2.

Auxiliary diode D21 and auxiliary reactor La2 is connected between node N2 and power supply terminal TN, and in series with each other.

Auxiliary reactor La2 has a second end connected to the anode of auxiliary diode D21, and a first end connected to power supply terminal TN.

Snubber diode D12 and snubber diode D22 are connected between node N1 and node N2, and in series with each other.

The arrangement of auxiliary diodes D11 and D21 is not limited to the location set forth above. For example, auxiliary diode D11 may be provided between power supply terminal TP and the second end of auxiliary reactor La1. In other words, auxiliary diode D11 has an anode connected to the second end of auxiliary reactor La1 and a cathode connected to power supply terminal TP.

Auxiliary diode D21 may be provided between power supply terminal TN and the first end of auxiliary reactor La2. In other words, auxiliary diode D21 has an anode connected to power supply terminal TN, and a cathode connected to the first end of auxiliary reactor La2.

Protection circuit 51 is connected between the emitter of main switch G1 and the collector of main switch G2. In protection circuit 51, primary windings Ls1 and Ls2 are connected between the emitter of main switch G1 and the collector of main switch G2.

In other words, primary winding Ls1 has a first end connected to the emitter of main switch G1 and the first end of snubber capacitor Cs1, and a second end connected to AC output terminal TOUT and the first end of primary winding Ls2.

Primary winding Ls2 has a first end connected to AC output terminal TOUT and the second end of primary winding Ls1, and a second end connected to the collector of main switch G2 and the first end of snubber capacitor Cs2. Primary windings Ls1 and Ls2 have the same winding direction.

Secondary winding Lf1 is coupled between node N3 and the positive electrode of DC power supply Vdc, and is magnetically coupled to primary winding Ls1. Secondary winding Lf1 and clamp diode Df1 are connected between node N3 and power supply terminal TP, and in series with each other.

In other words, secondary winding Lf1 has a first end connected to the anode of clamp diode Df1, and a second end connected to node N3. Secondary winding Lf1 has a winding direction opposite to that of primary winding Lf1. The turns ratio of the primary winding to the secondary winding of transformer Tr is 1:n, and n>2, for example.

Secondary winding Lf2 is coupled between node N3 and the negative electrode of DC power supply Vdc, and is magnetically coupled to primary winding Ls2. Secondary winding Lf2 and clamp diode Df2 are connected between node N3 and power supply terminal TN, and in series with each other.

In other words, secondary winding Lf2 has a first end connected to the anode of clamp diode Df2, and a second end connected to power supply terminal TN. Secondary winding Lf2 has a winding direction opposite to that of primary winding Ls2. The turns ratio of the primary winding to the secondary winding of transformer Tr is 1:n, and n>2, for example.

Clamp diode Df1 is connected between the positive electrode of DC power supply Vdc and the first end of secondary winding Lf1. In other words, clamp diode Df1 has a cathode connected to power supply terminal TP, and an anode connected to the first end of secondary winding Lf1.

Clamp diode Df2 is connected between node N3 and the first end of secondary winding Lf2. In other words, clamp diode Df2 has a cathode connected to node N3, and an anode connected to the first end of secondary winding Lf2.

The arrangement of clamp diodes Df1 and Df2 is not limited to the location set forth above, and may be provided on a current path PT. For example, clamp diode Df1 may be provided between node N3 and the second end of Lf1. In other words, clamp diode Df1 has an anode connected to node N3 and a cathode connected to the second end of secondary winding Lf1.

Clamp diode Df2 may be provided between power supply terminal TN and the second end of secondary winding Lf2. In other words, clamp diode Df2 has an anode connected to power supply terminal TN, and a cathode connected to the second end of secondary winding Lf2.

Soft-switching inverter 101 converts DC power supplied from DC power supply Vdc into AC power to supply the AC power to a load via output terminal TOUT by switching the DC power supplied from DC power supply Vdc through main switches that are the main arms.

Snubber capacitor Cs1 is provided to avoid application of voltage to main switch G1 when main switch G1 is turned off. Snubber capacitor Cs2 is provided to prevent voltage from being applied to main switch G2 when main switch G2 is turned off.

Control circuit 11 controls the switching of each of main switches G1 and G2.

Protection circuit 51 has a current path PT between the positive electrode of DC power supply Vdc and the negative electrode of DC power supply Vdc. Protection circuit 51 suppresses the maximum voltage applied to main switches G1 and G2 to a level VM smaller than 1.5 times the output voltage of DC power supply Vdc.

An operation during power conversion by soft-switching inverter 101 according to an embodiment of the present invention will be described hereinafter with reference to the drawings. First, an operation during a positive period in which current flows from soft-switching inverter 101 to the load will be described.

<Operation in Positive Period>

Figure 2:
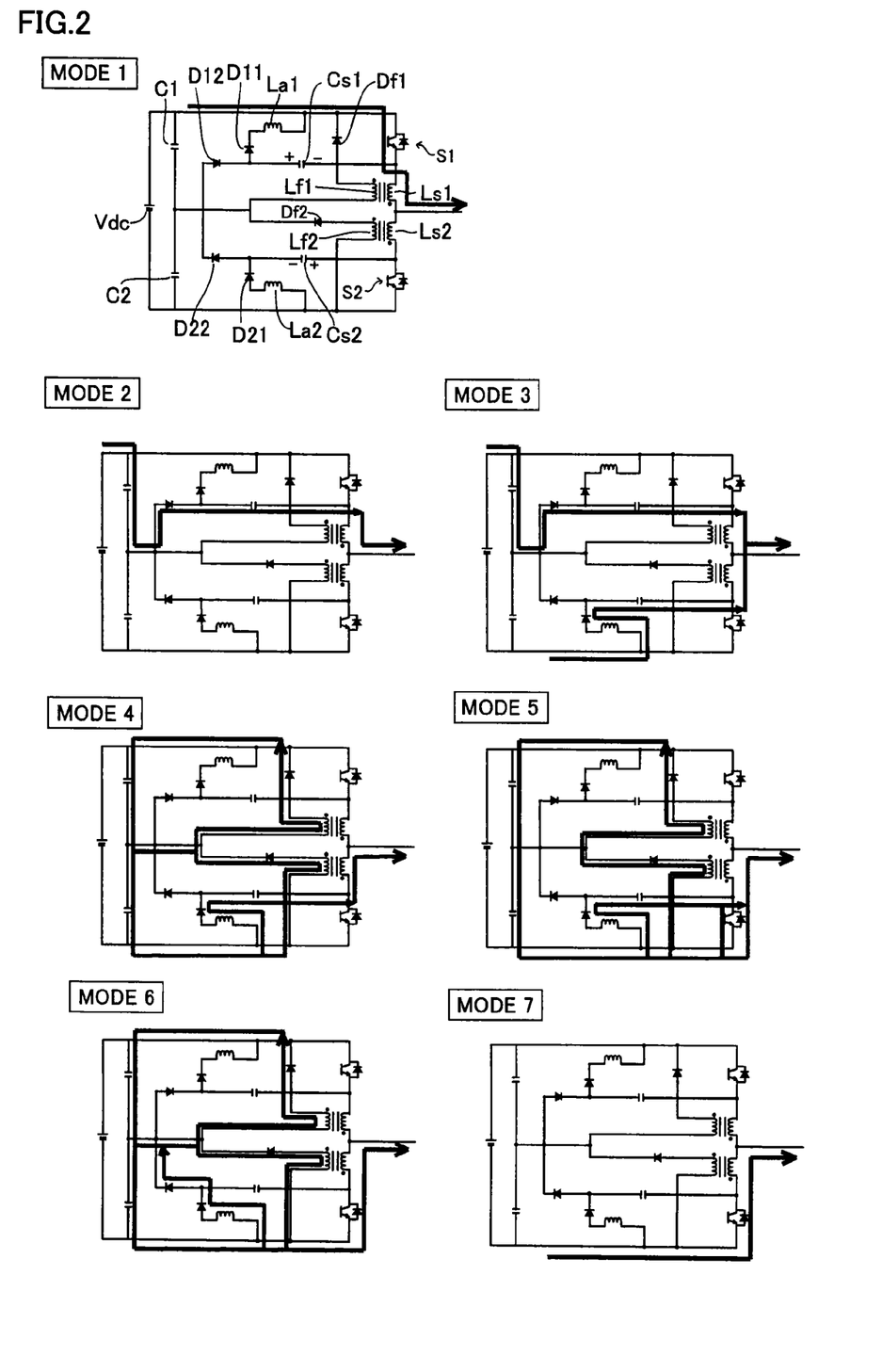
FIG. 2 represents the current flow in time series during power conversion by soft-switching inverter 101 according to an embodiment of the present invention.
Figure 3:
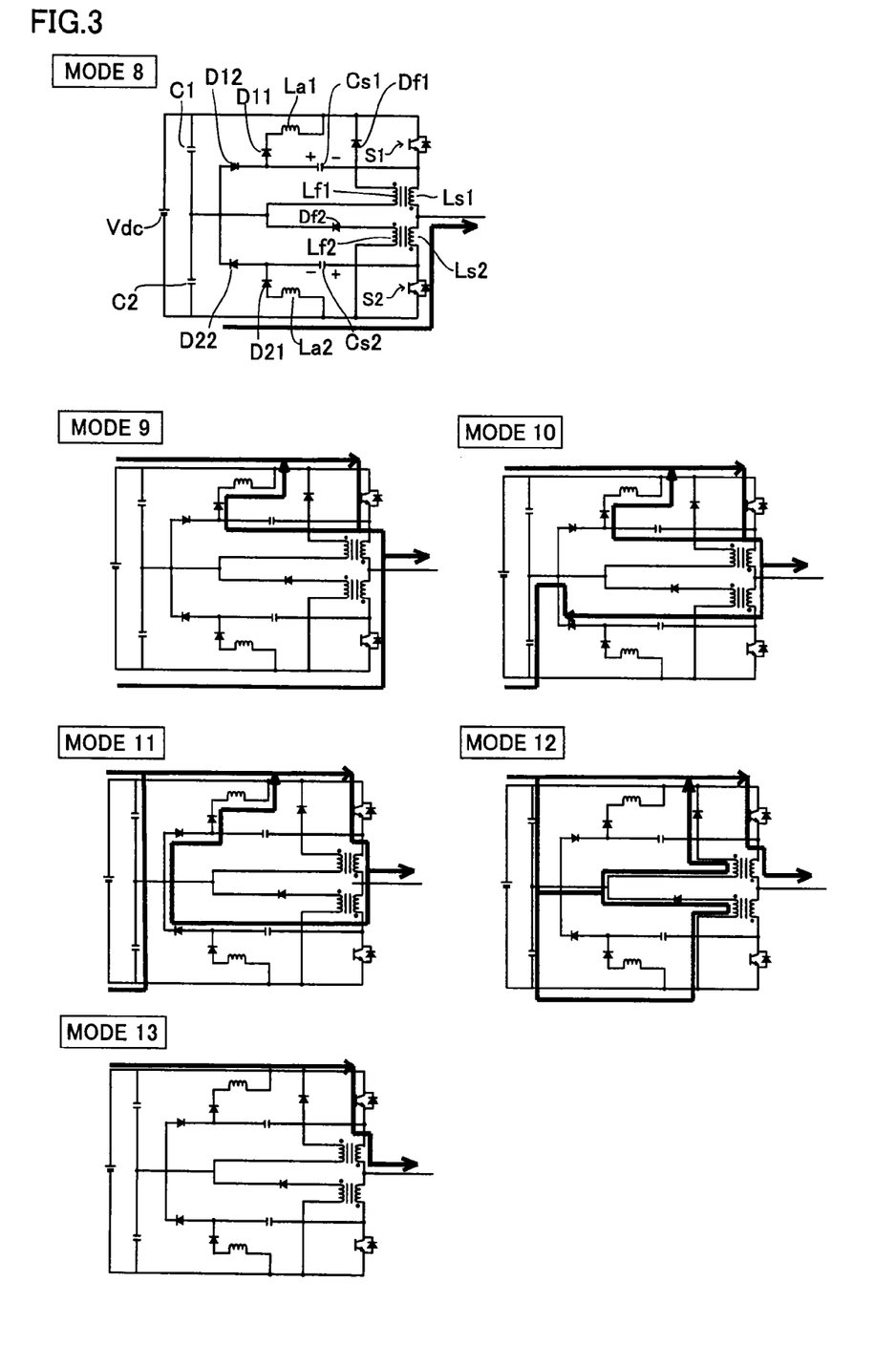
FIG. 3 represents the current flow in time series during power conversion by soft-switching inverter 101 according to an embodiment of the present invention.
Figure 4:
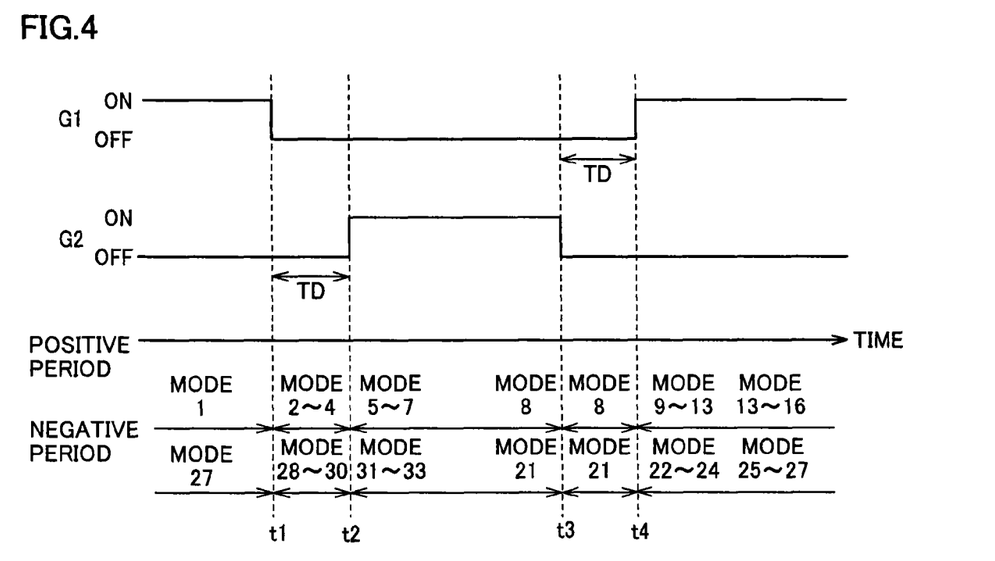
FIG. 4 represents switch control procedures during power conversion by soft-switching inverter 101 according to an embodiment of the present invention.

FIGS. 2 and 3 represent current flow in time series during power conversion by soft-switching inverter 101 according to an embodiment of the present invention. FIG. 4 represents switch control procedures during power conversion by soft-switching inverter 101 according to an embodiment of the present invention. As used herein, the output voltage of DC power supply Vdc is Vdc.

In other words, the operation is driven by a control signal having a dead time TD set as shown in FIG. 4. In the case where the load current at this stage is positive, the commutation from switch S1 to S2 follows the current path shown in FIG. 2, whereas the commutation from switch S2 to S1 follows the current path shown in FIG. 3.

In FIGS. 2 and 3, the "+" and "−" signs added at the side of snubber capacitors Cs1 and Cs2 indicate the polarity of the charge of the snubber capacitor.

The horizontal axis in FIG. 4 represents time. Each number along the horizontal axis represents corresponding modes shown in FIGS. 2 and 3.

Referring to FIGS. 2-4, first the state (mode 1) will be described of a current flow from DC power supply Vdc to a load through main switch G1, with main switch G1 controlled to be turned on and main switch G2 controlled to be turned off. In this mode 1, the current flowing towards the load is at a steady state. The initial voltage of snubber capacitor Cs1 has the same value (−Vdc/2) as DC division capacitor C1. The initial voltage of snubber capacitor Cs2 has a value of (½+1/n)Vdc.

Under this state, switch S1 is turned off at time t1. In other words, main switch G1 is controlled to be turned off. This causes commutation of the current from DC power supply Vdc towards snubber capacitor Cs1. Accordingly, snubber capacitor Cs1 is charged by the load current (mode 2).

Then, when voltage Vc2 of DC division capacitor C2 becomes equal to the total voltage of Vcs1 and Vcs2 of snubber capacitors Cs1 and Cs2, diode D21 is rendered conductive, whereby discharging of snubber capacitor Cs2 is initiated (mode 3).

When the voltage across switch S1 reaches a threshold value indicated by equation (1) that will be described afterwards, clamp diodes Df1 and Df2 are rendered conductive at the same timing. Current flows through path PT, and charging of snubber capacitor Cs1 is completed (mode 4).

At an elapse of a dead time TD, main switch G2 is controlled to be turned on at time t2 (ON). Accordingly, the resonance path changes, and discharging of snubber capacitor Cs2 is continued (mode 5).

The discharging operation of snubber capacitor Cs2 initiated at mode 3 is completed when the voltage across snubber capacitor Cs2 (Vcs2) reaches −Vdc/2. Snubber diode D22 is rendered conductive, so that the energy of auxiliary reactor La2 is regenerated towards DC division capacitor C2 (mode 6).

When the current of auxiliary reactor La2 and the secondary winding of the transformer becomes zero, the commutation from switch S1 to main diode D2 ends (mode 7).

Subsequent to the operation of mode 7 set forth above and until main switch G2 is controlled to be turned off from on (during time t2-time t3), load current flows through main diode D2 connected in parallel with main switch G2 and provided to have a current flowing direction opposite to that of main switch G2 (mode 8). Snubber capacitor Cs1 has a voltage of (½+1/n)×Vdc, whereas snubber capacitor Cs2 has a voltage of −Vdc/2.

Under this state, switch S2 is turned off at time t3. In other words, main switch G2 is controlled to be turned off. Then, at an elapse of dead time TD, when switch S1 is turned on at time t4, a discharging operation of snubber capacitor Cs1 that was charged is initiated. The current flowing to switch S2 (main diode D2) is reduced linearly (mode 9).

When the current at main diode D2 through which load current was flowing shown in mode 9 becomes zero, snubber diode D22 is rendered conductive, whereby charging of snubber capacitor Cs2 is initiated (mode 10).

The discharging operation of snubber capacitor Cs1 initiated at mode 9 is completed when the voltage (Vcs 1) across snubber capacitor Cs1 reaches −Vdc/2. Snubber diode D12 is rendered conductive, and the energy of auxiliary reactor La1 is regenerated towards DC division capacitor C1 (mode 11).

When the voltage across switch S2 reaches the threshold value indicated by equation (1) that will be described afterwards, likewise with mode 4, clamp diodes Df2 and Df1 are rendered conductive at the same timing. Current flows through path PT, and charging of snubber capacitor Cs2 is completed (mode 12).

When the current of auxiliary reactor La1 and the secondary winding of the transformer becomes zero, the commutation from main diode D2 to switch S1 ends (mode 13).

Mode 13 returns to a state identical to that of mode 1. In other words, in the series of modes 1-13, soft-switching inverter 101 of the embodiment causes commutation from the switch to the diode, and further from the diode to the switch.

<Operation in Negative Period>

Figure 5:
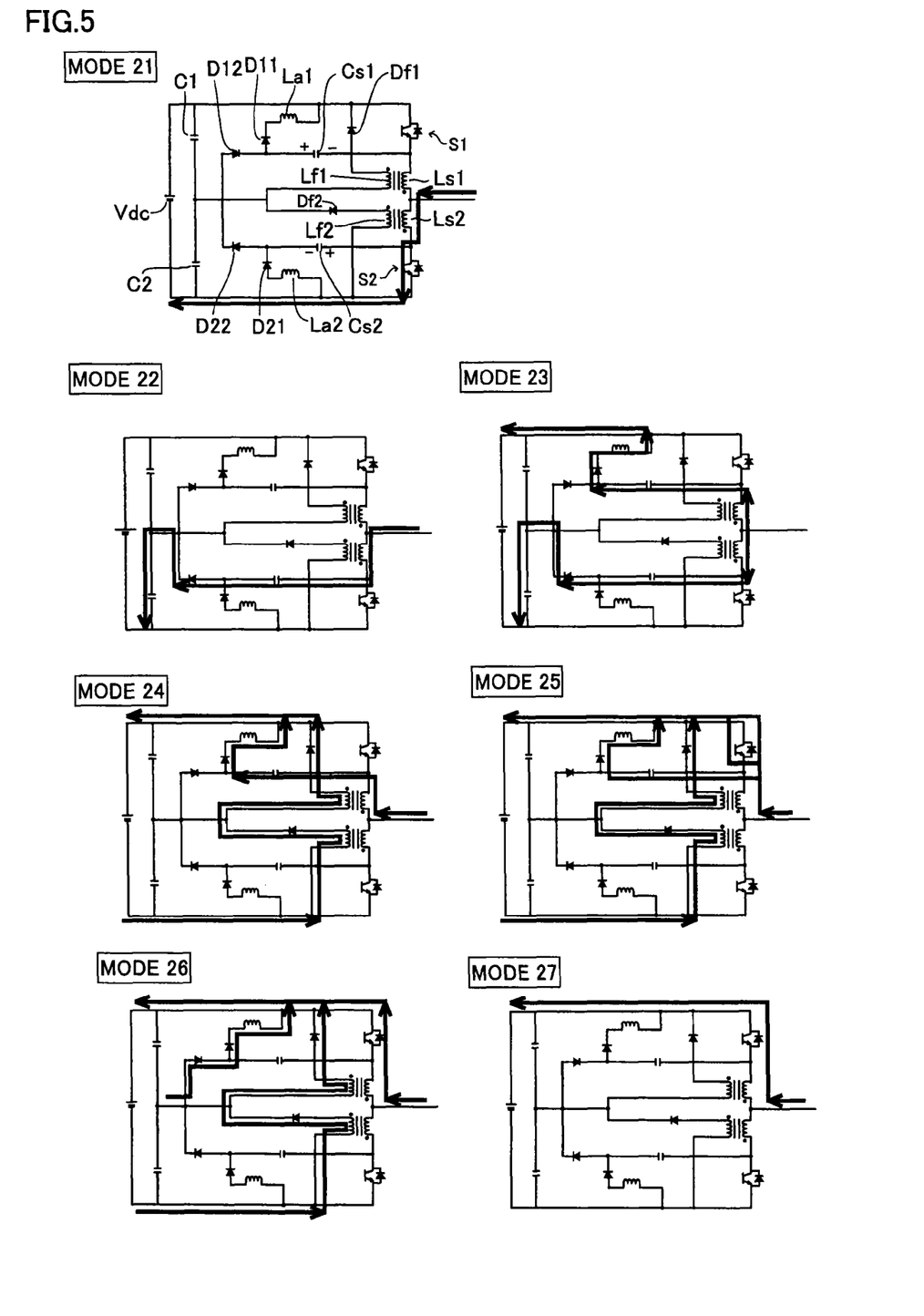
FIG. 5 represents the current flow in time series during power conversion by soft-switching inverter 101 according to an embodiment of the present invention.
Figure 6:
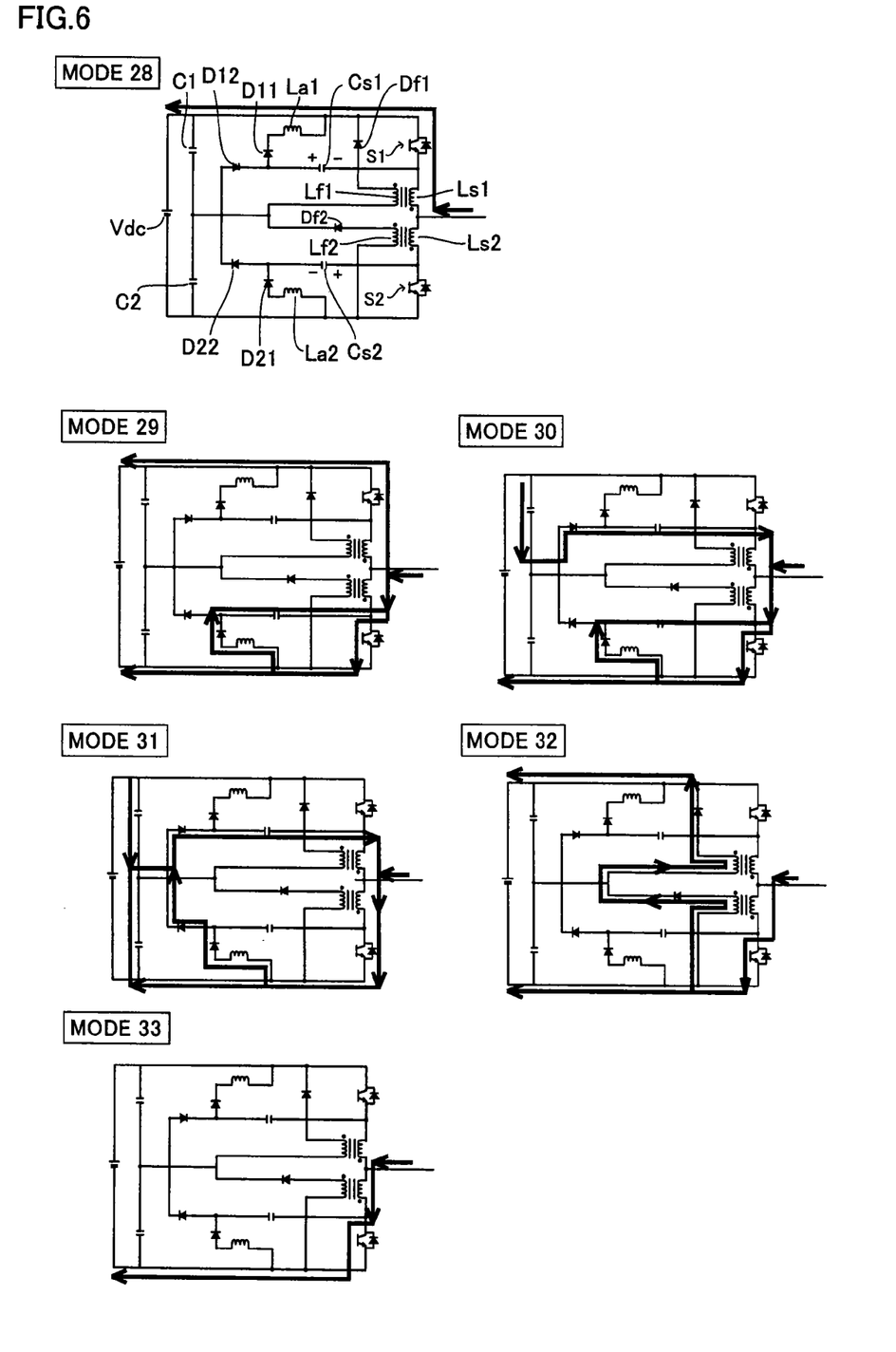
FIG. 6 represents the current flow in time series during power conversion by soft-switching inverter 101 according to an embodiment of the present invention.

Modes 1-13 have been described based on an operation where load current flows towards the load, i.e. an operation in the positive period. The operation in a negative period where load current flows towards soft-switching inverter 101 is similar, and will be described briefly hereinafter. FIGS. 5 and 6 represent in time series the flow of current during power conversion by soft-switching inverter 101 according to an embodiment of the present invention.

The horizontal axis in FIG. 4 represents time. Each number in the "negative period" along the horizontal axis represents corresponding steps shown in FIGS. 5 and 6.

Referring to FIGS. 4-6, first a state (mode 21) will be described in which main switch G2 and main switch G1 are controlled to be turned on and off, respectively, so that current flows to DC power supply Vdc from a load through main switch G2. In this mode 21, the current flowing to the load is at a steady state.

Under this state, switch S2 is turned off at time t3. In other words, main switch G2 is controlled to be turned off. This causes commutation of the current from the load towards snubber capacitor Cs2. Accordingly, snubber capacitor Cs2 is charged by the load current (mode 22).

When voltage Vc1 of DC division capacitor C1 becomes equal to the total of voltages Vcs1 and Vcs2 of snubber capacitors Cs1 and Cs2, diode D11 is rendered conductive. Discharging of snubber capacitor Cs1 is initiated (mode 23).

When the voltage across switch S1 reaches a threshold value, clamp diodes Df1 and Df2 are rendered conductive at the same timing. Current flows through path PT, and charging of snubber capacitor Cs2 is completed (mode 24).

At an elapse of dead time TD, main switch G1 is controlled to be turned on at time t4 (ON). Accordingly, the resonance path changes, and discharging of snubber capacitor Cs1 is continued (mode 25).

The discharging operation of snubber capacitor Cs1 initiated at mode 23 is completed when the voltage (Vcs1) across snubber capacitor Cs1 reaches −Vdc/2. Snubber diode D12 is rendered conductive, so that the energy of auxiliary reactor La1 is regenerated to DC division capacitor C1 (mode 26).

When the current at auxiliary reactor La1 and the secondary winding of the transformer becomes zero, the commutation from switch S2 to main diode D1 ends (mode 27).

Subsequent to the operation of mode 27 set forth above and until main switch G1 is controlled to be turned off from on (time t1), the load current flows through main diode D1 provided in parallel with main switch G1 so as to have a current flowing direction opposite to that of main switch G1 (mode 28). Snubber capacitor Cs2 has a voltage of (½+1/n)×Vdc, whereas snubber capacitor Cs1 has a voltage of −Vdc/2.

Under this state, switch S1 is turned off at time t1. In other words, main switch G1 is controlled to be turned off. Then, at an elapse of dead time TD, when switch S2 is turned on at time t2, the discharging operation of snubber capacitor Cs2 that was charged is initiated. Further, the current flowing to switch S1 (main diode D1) is linearly reduced (mode 29).

When the current of main diode D1 through which load current was flowing as shown in mode 29 is reduced to become zero, snubber diode D12 is rendered conductive, so that charging of snubber capacitor Cs1 is initiated (mode 30).

The discharging operation of snubber capacitor Cs2 initiated at mode 29 is completed when the voltage (Vcs2) across snubber capacitor Cs2 reaches −Vdc/2. Snubber diode D22 is rendered conductive, and the energy of auxiliary reactor La2 is regenerated to DC division capacitor C2 (mode 31).

Further, when the voltage across switch S1 reaches a threshold value, likewise with mode 24, clamp diodes Df1 and Df2 are rendered conductive at the same timing. Current flows through path PT, and charging of snubber capacitor Cs1 is completed (mode 32).

Then, when the current of auxiliary reactor La2 and the secondary winding of the transformer becomes zero, the commutation from main diode D1 to switch S2 ends (mode 33).

This mode 33 returns to the same state as mode 21. In other words, in the series of modes 21-33, soft-switching inverter 101 according to the embodiment causes commutation from the switch to the diode, and further from the diode to the switch.

<Comparison Between Soft-Switching Inverter 101 According to Embodiment and Soft-Switching Inverter 101X of Reference Example>

Figure 7:
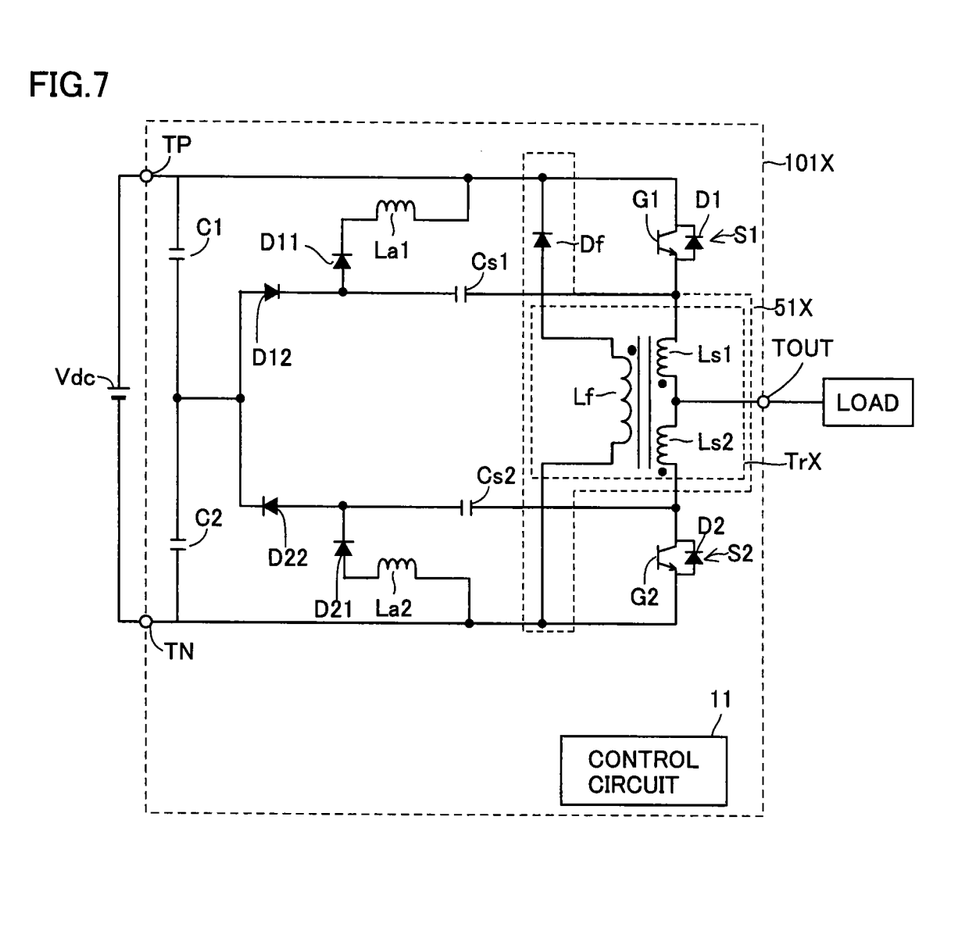
FIG. 7 represents a configuration of a soft-switching inverter 101X of a reference example.

FIG. 7 represents a configuration of a soft-switching inverter 101X of a reference example. Referring to FIGS. 1 and 7, soft-switching inverter 101X of a reference example will be described briefly, in comparison with soft-switching inverter 101 according to an embodiment. Soft-switching 101X includes a protection circuit 51X, instead of protection circuit 51 of soft-switching switching inverter 101. Protection circuit 51X includes a transformer TrX, and a clamp diode Df. Transformer TrX includes primary windings Ls1 and Ls2, and a secondary winding Lf.

In other words, soft-switching inverter 101 has, as compared to soft-switching inverter 101X, clamp diode Df divided into two as clamp diodes Df1 and Df2, and similarly secondary winding Lf of transformer Tr divided into two as secondary windings Lf1 and Lf2. Connection is established between the connection node of secondary windings Lf1 and Lf2 and the connection node between DC division capacitors C1 and C2 of the DC power supply.

In order to facilitate the understanding of soft-switching inverter 101 of the present embodiment, the maximum voltage applied to the main switch, clamp diode, and snubber capacitor constituting soft-switching inverter 101 and soft-switching inverter 101X will be evaluated hereinafter.

The maximum voltage applied to switches S1 and S2 and clamp diodes DF1 and Df2 constituting soft-switching inverter 101 can be expressed by equations (1) and (2), where n represents the turns ratio of Ls1 (Ls2) to Lf1 (Lf2). The relationship of the maximum voltage represented by equations (1) and (2) takes a tradeoff relationship.

Equation 1

$$V_{s \cdot max \cdot new} = \left(1 + \frac{1}{n}\right) V_{dc} \qquad (1)$$

Equation 2

$$V_{Df \cdot max \cdot new} = (1 + n) \frac{V_{dc}}{2} \qquad (2)$$

The maximum voltage applied to switches S1, S2 and clamp diode Df of soft-switching switching inverter 101X can be represented by equations (3) and (4), where nx represents the turns ratio of transformer TrX. The relationship of these maximum voltages similarly takes a tradeoff relationship.

Equation 3

$$V_{s \cdot max \cdot old} = \left(1 + \frac{2}{nx}\right) V_{dc} \quad (3)$$

Equation 4

$$V_{Df \cdot max \cdot old} = \left(1 + \frac{nx}{2}\right) V_{dc} \quad (4)$$

Further, the maximum voltage applied to snubber capacitors Cs1 and Cs2 constituting soft-switching inverter 101 can be represented by equation (5) set forth below.

Equation 5

$$V_{Cs \cdot max \cdot new} = \left(\frac{1}{2} + \frac{1}{n}\right) V_{dc} \quad (5)$$

The maximum voltage applied to snubber capacitors Cs1 and Cs2 constituting soft-switching inverter 101X can be represented by equation (6) set forth below.

Equation 6

$$V_{Cs \cdot max \cdot old} = \left(\frac{1}{2} + \frac{2}{nx}\right) V_{dc} \quad (6)$$

When the maximum voltage per clamp diode of soft-switching inverter 101 is to be set equal to the maximum voltage of the clamp diode of soft-switching inverter 101X, the relationship between the turns ratios n and nx of transformers Tr and TrX, respectively, can be represented by equation (7) set forth below.

Equation 7

$$n = nx + 1 \quad (7)$$

Based on Equations (1), (3) and (7), the relationship of the maximum voltage applied to the main elements of soft-switching inverter 101 and soft-switching inverter 101X can be represented by equation (8) set forth below.

Equation 8

$$V_{s \cdot max \cdot new} = \left\{\frac{nx}{nx + 1}\right\} V_{s \cdot max \cdot old} \quad (8)$$

It is appreciated from equation (8) that the maximum voltage applied to the main elements is lower at soft-switching inverter 101 than at soft-switching inverter 101X.

Further, based on equations (5), (6) and (7), the relationship of the maximum voltage applied to the snubber capacitors of soft-switching inverter 101X and soft-switching inverter 101X can be represented by equation (9) set forth below.

Equation 9

$$V_{Cs \cdot max \cdot new} = \left\{\frac{nx(nx + 3)}{(nx + 1)(nx + 4)}\right\} V_{Cs \cdot max \cdot old} \quad (9)$$

It is appreciated from equation (9) that the maximum voltage applied to the snubber capacitors is lower at soft-switching inverter 101 than at soft-switching inverter 101X.

Specifically, assuming that Vdc=200V and the clamp diode maximum voltage is $V_{Df.max.new} = V_{Df.max.old} = 600V$, for example, the turns ratio of soft-switching inverter 101 and soft-switching inverter 101X becomes n=5, nx=4, respectively. Also, the main element maximum voltage becomes $V_{s.max.new}$=240, $V_{s.max.old}$=300, and the snubber capacitor maximum voltage becomes $V_{s.max.new}$=140, $V_{s.max.old}$=200. Therefore, the maximum voltage of the main elements and clamp capacitors is reduced as low as approximately 80% and approximately 70%.

By employing the above-described configuration of soft-switching inverter 101 according to the embodiment, the maximum voltage of the main elements and snubber capacitors can be reduced, leading to reducing the size and cost of the apparatus.

Lastly, the embodiment will be summarized referring to the drawings.

As shown in FIG. 1, soft-switching inverter 101 according to an embodiment is a power conversion apparatus converting DC power supplied from DC power supply Vdc having power supply terminals TP and TN into AC power for supply to a load. The power conversion apparatus includes an AC terminal (TOUT) for outputting AC power; a DC division capacitor C1 and a DC division capacitor C2 connected in series between power supply terminals TP and TN; a main switch G1 having a first end coupled to the power supply terminal of DC power supply Vdc and a second end coupled to the load; a main diode D1 connected in parallel with main switch G1 so as to have a conducting direction opposite to that of main switch G1; a main switch G2 having a first end coupled to the second end of main switch G1 and a second end coupled to the power supply terminal of DC power supply Vdc, and provided so as to have a conducting direction identical to that of main switch G1; a main diode D2 connected in parallel with main switch G2 so as to have a conducting direction opposite to that of main switch G2; snubber capacitors Cs1 and Cs2; snubber diodes D12 and D22 connected in series between snubber capacitors Cs1 and Cs2; a protection circuit 51 to cause, when voltage applied to snubber capacitor Cs1 becomes greater than or equal to a predetermined value or when voltage applied to snubber capacitor Cs2 becomes greater than or equal to a predetermined value, a charging current formerly flowing from DC power supply Vdc to snubber capacitor Cs1 or Cs2 to flow to another current path; and a control circuit 11 controlling main switches G1 and G2 to be turned on and off. Snubber capacitor Cs1 is provided between an anode of main diode D1 and a cathode of snubber diode D12. Snubber capacitor Cs2 is provided between a cathode of main diode D2 and an anode of snubber diode D22. Protection circuit 51 includes a transformer Tr; and clamp diodes Df1 and Df2 connected in parallel with main switches G1 and G2, and provided between the power supply terminals so as to have a conducting direction opposite to that of main switches G1 and G2. Control circuit 11 provides control, during a positive period in which current flows from the power conversion apparatus to the load, such that when main switch G1 is turned off from on, main switch G2 is turned on from off at an elapse of a predetermined time (TD), and when main switch G2 is turned off from on, main switch G1 is turned on from off at an elapse of a predetermined time (TD).

According to another aspect of the embodiment, soft-switching inverter 101 soft-switching inverter 101 is a power conversion apparatus converting DC power supplied from DC power supply Vdc having a power supply terminals TP and TN into AC power for supply to a load. The power conversion apparatus includes an AC terminal (TOUT) from which AC power is output; a DC division capacitor C1 and a DC division capacitor C2 connected in series between power supply terminals TP and TN; a main switch G1 having a first end coupled to the power supply terminal of DC power supply Vdc and a second end coupled to the load; a main diode D1 connected in parallel with main switch G1 so as to have a conducting direction opposite to that of main switch G1; a main switch G2 having a first end coupled to the second end of main switch G1 and a second end coupled to the power supply terminal of DC power supply Vdc, and provided so as to have a conducting direction identical to that of main switch G1; a main diode D2 connected in parallel with main switch G2 so as to have a conducting direction opposite to that of main switch G2; snubber capacitors Cs1 and Cs2; snubber diodes D12 and D22 connected in series between snubber capacitors Cs1 and Cs2; a protection circuit 51 to cause, when voltage applied to snubber capacitor Cs1 becomes greater than or equal to a predetermined value or when voltage applied to snubber capacitor Cs2 becomes greater than or equal to a predetermined value, a charging current formerly flowing from DC power supply Vdc to snubber capacitor Cs1 or Cs2 to flow to another current path; and a control circuit 11 controlling main switches G1 and G2 to be turned on and off. Snubber capacitor Cs1 is provided between an anode of main diode D1 and a cathode of snubber diode D12. Snubber capacitor Cs2 is provided between a cathode of main diode D2 and an anode of snubber diode D22. Protection circuit 51 includes a transformer Tr; and clamp diodes Df1 and Df2 connected in parallel with main switches G1 and G2, and provided between the power supply terminals so as to have a conducting direction opposite to that of main switches G1 and G2. Transformer Tr includes primary windings Ls1 and Ls2 connected in series, and secondary windings Lf1 and Lf2 provided corresponding to primary winding Ls1 and Ls2, respectively. The connection node of primary windings Ls1 and Ls2 is connected to the AC terminal. A coupling node N3 between a first unit having clamp diode Df1 and secondary winding Lf1 connected in series and a second unit having clamp diode Df2 and secondary winding Lf2 connected in series is connected to the connection node of DC division capacitors C1 and C2.

Further preferably, the power conversion apparatus further includes an auxiliary diode D11 and an auxiliary reactor La1 connected in series with snubber capacitor Cs1 and coupled between snubber capacitor Cs1 and the first end of main switch G1 so as to have a conducting direction opposite to that of main switch G1; and an auxiliary diode D21 and an auxiliary reactor La1 connected in series with snubber capacitor Cs2 and coupled between snubber capacitor Cs2 and the second end of main switch G2 so as to have a conducting direction opposite to that of main switch G2.

Preferably, transformer Tr includes primary windings Ls1 and Ls2 connected in series, and secondary windings Lf1 and Lf2 provided corresponding to primary winding Ls1 and Ls2, respectively. The connection node of secondary windings Lf1 and Lf2 is connected to the connection node of DC division capacitors C1 and C2.

Preferably, the coupling node of secondary windings Lf1 and Lf2 is connected to the connection node of snubber diodes D12 and D22.

Further preferably, control circuit 11 provides control to turn on main switch G2 at an elapse of a predetermined time from main switch G1 being turned off, to turn off main switch G2 at an elapse of a predetermined time from main switch G2 being turned on, and to turn on main switch G1 at an elapse of a predetermined time from main switch G2 being turned off.

It is to be understood that the embodiments disclosed herein are only by way of example, and not to be taken by way of limitation. The scope of the present invention is not limited by the description above, but rather by the terms of the appended claims, and is intended to include any modifications within the scope and meaning equivalent to the terms of the claims.

REFERENCE SIGNS LIST 101 soft-switching inverter; 11 control circuit; 51 protection circuit; C1, C2 DC division capacitor; Cs1, Cs2 snubber capacitor; D1, D2 main diode; D11, D21 auxiliary diode; D12, D22 snubber diode; Df, Df1, Df2 clamp diode; G1, G2 main switch; La1, La2 auxiliary reactor; Lf, Lf1, Lf2 secondary winding; Ls1, Ls2 primary winding; S1, S2 switch; TD dead time; TN, TP power supply terminal; TOUT AC output terminal; Tr, TrX transformer; n, nx turns ratio.

The invention claimed is:
1. A power conversion apparatus converting DC power supplied from a DC power supply having a first electrode and a second electrode into AC power for supply to a load, said power conversion apparatus comprising:
an AC terminal for outputting said AC power,
a first DC division capacitor and a second DC division capacitor connected in series between said first electrode and said second electrode,
a first main switch having a first end coupled to said first electrode of said DC power supply, and a second end coupled to said load,
a first main diode connected in parallel with said first main switch, so as to have a conducting direction opposite to the conducting direction of said first main switch,
a second main switch having a first end coupled to a second end of said first main switch, and a second end coupled to said second electrode of said DC power supply, and provided so as to have a conducting direction identical to the conducting direction of said first main switch,
a second main diode connected in parallel with said second main switch, so as to have a conducting direction opposite to the conducting direction of said second main switch,
a first snubber capacitor and a second snubber capacitor,
a first snubber diode and a second snubber diode connected in series between said first snubber capacitor and said second snubber capacitor,
a protection circuit for causing, when voltage applied to said first snubber capacitor becomes greater than or equal to a predetermined value or when voltage applied to said second snubber capacitor becomes greater than or equal to a predetermined value, a charging current formerly flowing from said DC power supply to said first snubber capacitor or said second snubber capacitor to flow to another current path, and
a control circuit controlling said first main switch and said second main switch to be turned on and off, said first snubber capacitor provided between an anode of said first main diode and a cathode of said first snubber diode, said second snubber capacitor provided between a cathode of said second main diode and an anode of said second snubber diode, said protection circuit including a transformer, and a first clamp diode and a second clamp diode connected in parallel with said first main switch and said second main switch, and provided between said first electrode and said second electrode, so as to have a conducting direction opposite to the conducting direction of said first main switch and said second main switch, said transformer including a first primary winding and a second primary winding connected in series, and a first secondary winding and a second secondary winding provided corresponding to said first and second primary windings, respectively, a connection node of said first primary winding and said second primary winding being connected to said AC terminal, and a coupling node of a first unit having said first clamp diode and said first secondary winding connected in series and a second unit having said second clamp diode and said second secondary winding connected in series being connected to a connection node of said first DC division capacitor and said second DC division capacitor.

2. The power conversion apparatus according to claim 1, further comprising:

a first auxiliary diode and an auxiliary reactor connected in series with said first snubber capacitor, and coupled between said first snubber capacitor and a first end of said first main switch, so as to have a conducting direction opposite to the conducting direction of said first main switch, and a second auxiliary diode and a second auxiliary reactor connected in series with said second snubber capacitor, and coupled between said second snubber capacitor and a second end of said second main switch so as to have a conducting direction opposite to the conducting direction of said second main switch.

3. The power conversion apparatus according to claim 1, wherein said control circuit provides control to turn on said second main switch at an elapse of a predetermined time from said first main switch being turned off, to turn off said second main switch at an elapse of a predetermined time from said second main switch being turned on, and to turn on said first main switch at an elapse of a predetermined time from said second main switch being turned off.

* * * * *